United States Patent Office 3,039,973
Patented June 19, 1962

3,039,973
SPHERICAL CONTACT MASSES
Alfred J. Robinson, South Plainfield, and Walter L. Haden, Jr., Metuchen, N.J., assignors to Minerals & Chemicals Philipp Corporation, a corporation of Maryland
No Drawing. Filed Aug. 5, 1959, Ser. No. 831,694
17 Claims. (Cl. 252—450)

This invention relates to adsorptive contact masses prepared from kaolin clay and more particularly to adsorptive contact masses in the form of hard spherical particles useful particularly as catalysts in fluid type processes for the conversion of hydrocarbons, and to the preparation of such contact masses. The adsorptive contact masses of the invention are also useful as adsorbents for decolorizing vegetable and mineral oils, and for various other purposes.

Contact masses for fluid processes must be small enough to permit their suspension in the stream of hydrocarbon vapors being contacted so that the resulting solid-gas system assumes the flow characteristics of a fluid. Experience has shown that the particles preferably should be small spheres, conventionally called microspheres, from about 20 to about 150 microns in equivalent spherical diameter, but in any case with not more than about 20 percent by weight of the particles being finer than about 40 microns. In addition to possessing the desired degree of activity and selectivity, such contact masses must be sufficiently hard to resist attrition since attrition results in the production of ultra-fine catalyst solids (e.g., those particles finer than about 10 microns) and such fines are carried out in effluent vapors and cannot be effectively separated from the vapors by the cyclone separators and electrostatic precipitators ordinarily used to separate solids from the contacted vapors. Fines resulting from attrition thus represent an economic loss since they cannot be recovered, regenerated and returned to the system.

The catalytic activity level of kaolin clays as mined is too low for commercial usage in present day hydrocarbon conversion processes and, in addition, raw kaolin clay is a soft material which would be readily attrited during use. Various methods have been proffered for treating kaolin clay to produce an activated clay useful as an adsorptive contact mass for oils and as a catalyst in fluid hydrocarbon conversion processes, such as fluid cracking processes. None of these has afforded a simple inexpensive method by means of which active microspheres characterized by exceptional hardness are provided.

Accordingly, a principal object of our invention is to produce from kaolin clay novel adsorptive contact masses in the form of hard spherical particles especially suitable as a catalyst in a conventional fluid hydrocarbon conversion process.

Another object of our invention is to provide a process for converting kaolin clay into an adsorptive contact masss in the form of small spherical particles or microspheres of exceptional hardness.

Other objects and features of our invention will be apparent from the description thereof which follows.

We have found that adsorptive contact masses can be produced in the form of exceptionally hard microspheres, especially suitable for conventional fluid hydrocarbon conversion processes, by a series of steps hereafter set forth. It will be distinctly understood that as used in the description of our invention and in the claims, the term "microspheres" is intended to encompass not only those shapes that are truly spherical but also shapes which approach spherical as, for example, those which are sometimes referred to as spheroidal.

Briefly stated, the method of the present invention involves the initial step of reacting kaolin clay with sulfuric acid under conditions such that the water-soluble, nonvolatile reaction products, principally aluminum sulfate, are maintained in intimate contact with the reactants until reaction is completed. This condition is established by forming a plastic mixture of kaolin clay and sulfuric acid and permitting the acid to react with the clay in the absence of a liquid aqueous phase external to and in contact with the plastic clay-acid mixture. Only after reaction is completed are the soluble reaction products dissolved from the insoluble residue, this being accomplished by slurrying the reacted clay-acid mass in water using at least sufficient water to dissolve substantially completely water-soluble reaction products. This slurry, without filtration to remove soluble reaction products, is then sprayed into an atmosphere of inert hot gas, such as air, to evaporate water from droplets of the slurry, thereby forming microspheres which comprise a uniform mixture of the insoluble clay residue with the soluble sulfate reaction product. The spray drying step is carried out under conditions such that the temperature of hot gas initially contacting sprayed droplets is below that at which hollow microspheres are formed rather than the desired hard solid microspheres. The microspheres are then desulfated by calcination at an elevated temperature to produce the desired fluid catalyst, which is hereafter referred to as "kaolin cracking catalyst."

The hardness of the microspheres produced by this method exceeds that of other fresh fluid commercial alumino-silicate cracking catalysts but prepared by other methods, as exemplified by so-called "gel" aluminosilicate cracking catalysts prepared from hydrous alumina and hydrous silica, as well as microspherical cracking catalysts prepared from kaolin clay by other methods.

The activity and selectivity of the product may be controlled through variation in the mol ratio of acid to aluminum present in the clay and by choice of desulfation conditions.

Although the aforementioned steps in combination result in the transformation of a soft material of low native activity into hard microspheres possessing high activity and good selectivity, nevertheless, with all the desirable changes, the volatile-free chemical analysis of the product is essentially that of the kaolin clay reactant. Although not intending to be bound by any theory in connection with the mechanism involved, the changes produced in kaolin by the treatment of the present invention would seem to result from a reorientation of at least a portion of the aluminum in the clay lattice, the reorientation being such that the final material has greater hardness and surface area (hence greater activity) than the original clay.

The process of the present invention is fundamentally different in nature from the process of converting kaolin clay into an active cracking catalyst as described in U.S. 2,485,626, to Mills. Basically, the Mills procedure contemplates the removal of aluminum from calcined kaolin clay by an acid leach so that the aluminum content of the catalyst is less than that of the starting kaolin whereas in the subject procedure, the aluminum removed from the clay residue in the form of a sulfate during the slurrying step must be restored to the residue of the clay during the subsequent step of spray drying the slurry. Mills employs a substantial volume of dilute sulfuric acid relative to clay and reaction between the calcined clay and acid is conducted under conditions such that the clay is immersed in the dilute acid in order to accomplish the desired leaching of aluminum from the clay. In Mills' procedure an aqueous reaction medium is thus present and reaction proceeds well below the boiling point of water. We have found, however, that when the reaction between kaolin clay and sulfuric acid is conducted under conditions similar to those set forth by Mills (namely, by using dilute acid so that soluble metallic sulfate reaction products are dissolved as they are formed) and such reaction mixture is spray dried and calcined, very soft, unacceptable microspheres are formed.

In view of the fact that aluminum sulfate exists in the form of various hydrates as well as basic and acid aluminum sulfates, it would seem that a logical explanation for this phenomenon is that the form of aluminum sulfate produced in accordance with the method of the subject invention, differs from the form of aluminum sulfate produced when the clay is immersed in acid and reacted in an aqueous medium. Accordingly, the orientation of alumina in the desulfated microspheres would be expected to be different under the two different sets of reaction conditions.

Kaolin clays are hydrous aluminosilicates containing as the chief mineral constituent kaolinite, which is represented by the empirical formula $Al_2O_3.2SiO_2.2H_2O$. The weight ratio of $SiO_2$ to $Al_2O_3$ indicated by this formula is about 1.18:1 and kaolin clays normally possess $SiO_2/Al_2O_3$ weight ratios of from 1.0 to 1.5:1. Kaolin clays are not, however, restricted to a clay composed of the single mineral species kaolinite, but are represented by at least four distinct species; namely, kaolinite, nacrite, anauxite and dickite, all characterized by the formula above given. In addition to alumina and silica, kaolin clays frequently contain various minor amounts of ferruginous and titaniferous matter.

We prefer to use degritted raw kaolin as a starting material in the process, i.e., kaolin clay which has been refined to the extent that grit, foreign bodies and clots of undispersed clay have been eliminated but which has been given no other preliminary treatment. However, we wish to have it clearly understood that the invention is not limited to the treatment of such a product since kaolin clays which have received other preliminary treatment, not entailing appreciable removal of aluminum, may be amenable to processing in accordance with the invention. Examples of preliminary treatments falling within this category are deironing by physical or chemical methods, conventional classifying operations and even partial acid activation by the previously mentioned wet procedures. It has been found, however, that calcination of kaolin clay prior to treatment with acid, renders it less suitable for the process. Calcination, as opposed to drying, is a heat treatment at temperature levels sufficiently high to remove some or all water of crystallization from the clay. The minimum temperature at which water of crystallization is removed from clay is somewhat a function of time but is generally about 800° F. Likewise, the volatile matter content (V.M.) of the starting clay should not be so high as to make too dilute a mixture of acid and clay for optimum handling and to form the desired plastic mass with the acid. The term "volatile matter" or (V.M.) as used herein, refers to the weight percentage of material eliminated by heating essentially to constant weight at about 1700° F. In the case of raw clay, volatile matter is mostly water. Excellent results are obtainable using a starting clay of about 14 percent V.M.

The kaolin clay is initially mixed to apparent homogenity with a 60 percent to 200 percent dosage of sulfuric acid. Acid dosage is defined as the weight of 100 percent acid per unit weight of volatile free clay, expressed on a percentage basis. Volatile free clay is that which has been heated essentially to constant weight at 1700° F. Below 60 percent dosage the clay conversion falls off to ineffectual levels for petroleum cracking purposes whereas above 200 percent dosage the ultimate microspherical product is too soft for commercial acceptance. Preferably the acid dosage is within the range of from 70 prcent to 150 percent, with microspheres of particularly outstanding hardness as well as activity and selectivity being produced, using about a 90 percent to 110 percent dosage. The acid, in appropriate dosage, may be mixed with the clay, in the form of a dilute or a concentrated aqueous solution, taking care, when using dilute acid to dry the clay-acid mixture previous to reaction so that the mix is in the form of a compact plastic mass having apparently only one phase, as opposed to a fluid dispersion of a solid in an external liquid phase. When dilute acids, e.g., sulfuric acid of 20 percent or 30 percent concentration is mixed with the clay in adequate dosage, the resultant mixture consists of solid particles dispersed in a substantial volume of acid and if the clay and acid are reacted in such form, and the reaction mixture spray dried and then desulfated, the resultant catalyst spheres will be very soft and unacceptable. In view of this fact, we prefer to mix the clay directly with concentrated sulfuric acid, such as acid of 60 percent to 100 percent concentration, and obviate such a drying step. We have found that sulfuric acid of 90 percent to 100 percent concentration results in catalyst spheres of outstanding hardness as well as possessing a degree of activity and selectivity suitable for most applications.

The clay-acid mass is reacted in air, preferably in a vented oven, under conditions such that water formed during reaction is driven off as it is formed. Reaction is initiated by heating the mass to about 200° F. at which temperature a spontaneous exotherm develops and the temperature of the mass rises sharply to about 400° F., at which point reaction of acid with aluminum of the clay is extensive. To complete reaction between the acid and aluminum the oven temperature may be held at a temperature within the range of from about 250° F. to about 500° F. until reaction is completed. The total reaction time will obviously depend on the efficiency of heat transfer in the oven and is usually from about 1 to 3 hours, although the mass may be held at elevated temperature up to about 500° F. for 24 hours and more without adverse effect. As reaction progresses the consistency of the mass increases and at the completion of reaction the product is a hard solid.

The solid reaction product, preferably crushed in any suitable apparatus, is then slipped or slurried with water, using at least sufficient water to dissolve the soluble aluminum sulfate reaction product and such additional quantities of water as may be required to produce a slurry of sprayable consistency. The preparation of the slurry may be accomplished in any suitable agitating equipment and may be facilitated by heating the mixture to about 150° F. The slurry will comprise finely divided particles of insoluble silica (as well as finely divided particles of kaolin in the case that the acid dosage employed was less than that required to react completely with the aluminum in the clay), these particles being suspended in an aluminum sulfate liquor containing various amounts of unreacted acid.

The solids content of the slurry will ordinarily be within the range of from about 10 percent to 25 percent by weight, with the maximum solids content being dictated in good measure by the acid dosage employed since, as has been mentioned above, sufficient water must be present in the slurry to dissolve soluble reaction products. The minimum solids content is determined principally by economic consideration since drying of large quantities of water adds unnecessarily to the processing costs. Thus, the optimum solids content of the slurry is best determined experimentally for the particular acid dosage used and the specific spray drying equipment to be employed.

An important feature of our invention is that the whole of the slurry is spray dried or, in other words, a portion or all of the aluminum sulfate liquor is not filtered or otherwise removed from the insolubles in the slurry, thereby reducing the aluminum content of the finished catalyst appreciably. Obviously, loss of minor quantities of liquor from the slurry as may occur in handling will have no substantially detrimental effect. We have found that if sufficient liquor is taken out of the slurry to reduce the $Al_2O_3$ content of the finished catalyst by as much as about 10 percent, for example, the product is a soft material readily attrited during service and unacceptable for commercial usage.

The slurry is spray dried into an atmosphere of hot inert gas to cause water to evaporate from droplets of the slurry so as to produce the desired small spheres which are convertible by high temperature treatment, hereafter described, into active catalytic masses. Spray driers of various designs may be used for the purpose and may be of the concurrent, cocurrent or mixed flow types, and include nozzles or spinning discs, etc., for atomization of the slurry into droplets.

Spray drying is conducted under conditions such that the temperature of the gases initially contacting the droplets of slurry is below that at which hollow microspheres will be formed rather than the desired hard solid microspheres. The gases initially contacting the droplets may have a temperature from 212° F. up to about 550° F., the upper limit varying somewhat with the moisture content of the gases initially contacting the atomized slurry and, hence, with the type of drier used. The hot drying gas may be air, nitrogen-air mixtures or any gas or gaseous mixture of suitable heat transfer properties which is chemically inert towards the various constituents in the slurry. Particularly good results are realized under condition such that the droplets first contact gases at temperatures of the order of 250° F. to 350° F. Utilizing a countercurrent drier, the temperature of inlet gases may be higher than the temperatures specified above.

By proper control of conditions under which the aqueous slurry is spray dried, spherical particles of the desired size range may be obtained. The particle size may be varied by control of relative feed rates of solids and gas, by control of the solids content of the feed slurry, and other means well known in the art.

The volatile matter content of the spray dried product is determined by the operating conditions employed in the drier. The volatile matter content of the spray dried product is typically between 55 and 62 percent. Microspheres which are too moist agglomerate in the spray drier and stick to the walls of the drier. Microspheres which have been produced by spray drying at excessive temperatures and which have too low a volatile matter content are hollow soft particles.

Prior to their desulfation the microspheres are preferably dried at a temperature of from about 212° F. to about 600° F., and preferably from about 300° F. to 500° F., to a volatile matter content not greater than about 50 percent since microspheres having much higher volatile matter contents may be prone to fracture in the ensuing high temperature treatment.

What has been accomplished thus far in the process is that a substantial portion of the aluminum in the clay has been sulfated, following which the metallic sulfate reaction product has been dissolved from the clay residue. Thereafter the sulfate salt is restored in full to the clay residue simultaneously with the formation of microspheres, the microspehres consisting of an intimate and uniform mixture of sulfate of aluminum with the clay residue as the matrix and having essentially the same aluminum and silicon analyses as the starting clay. The microspheres are not yet active catalysts and must be further processed at elevated temperatures to impart to them the desired activity and selectivity.

The sulfated microspheres are desulfated by contact with hot gases to decompose substantially completely metallic sulfates into their corresponding oxides and eliminate unreacted acid, if any is present. There is strong evidence that the calcination also results in interbonding of aluminum with silicon through oxygen linkages. In most cases a temperature of from about 900° F. to about 1600° F., depending on the atmosphere, and a time between 1 and 24 hours is sufficient for desulfation. While we do not wish to exclude calcination temperatures outside of the range stated, we would like to make it clear that at temperatures much below 900° F. the aluminum sulfate decomposition may be incomplete, and that desulfation at temperatures above 1600° F. may manifest themselves in lowered surface area of the final contact masses. Calcination may be in air, or, more preferably, in the presence of a reducing gas or gas mixture, e.g., carbon monoxide, hydrogen or methane, for example. By conducting the desulfation of the microspheres in the presence of reducing components, the desulfation may be carried out at temperatures appreciably below 1423° F., the normal decomposition temperature of $Al_2(SO_4)_3$.

It is within the scope of our invention to incorporate various additives in the composition to provide catalysts having properties desirable for specific applications. Insoluble materials may be incorporated with the plastic mass of clay and acid, whereas soluble materials may be added at this stage of the processing or, preferably, they are added to the aqueous slurry prior to the spray drying step, as will be the case when additional quantities of acid are added to the reacted clay-acid mass. A combustible filler, in an amount not more than about 10 percent, on a total weight mix basis, may be incorporated in the clay-acid mixture prior to reaction. This filler, among other things, serves to increase the porosity of the final catalyst since it is eliminated during the calcination step, leaving voids. Examples of fillers suitable for the purpose are wood flour, corn meal, sawdust, carbon.

EXAMPLE I

This example illustrates the preparation of a microspherical cracking catalyst from kaolin clay in accordance with our invention. The clay used was Klondyke Water Washed kaolin clay, a sedimentary Georgia clay having the following analysis (on a volatile free weight basis): $SiO_2$, 51.84%; $Al_2O_3$, 45.32%; $Fe_2O_3$, 0.40%; MgO and CaO, not detectable; $Na_2O$, 0.03%; $K_2O$, 0.06%. The V.M. of the clay was 14%.

A forty pound batch of the kaolin clay was charged to a pugger and to the kaolin was added 9790 ml. of a 95.2% (by weight) $H_2SO_4$ solution during a period of about 5 minutes. The kaolin-acid mixture was pugged for an additional 15 minutes.

The kaolin-acid mix was then transferred to a gas-fired oven. The oven temperature was raised from about 70° F. to about 500° F. in an hour and then maintained at 500° F. for 1½ hours, after which the reacted kaolin-acid mass was removed from the oven and crushed to about minus 2 mesh.

Sixty pounds of the reaction product was mixed with 162 pounds of water for a 3 hour period. The resulting slip was spray dried in a cocurrent air spray drier using an inlet temperature of about 375° F. The volatile matter content of the spray-dried product was 59 percent.

The resulting microspheres were then heated in a batch type indirect-fired rotary furnace in which the vapor temperature was raised to about 500° F. in an hour and held there for about one hour. The microspheres were cooled in the rotary for about 30 minutes and then discharged. The volatile matter content of the dried microspheres was 50 percent.

The product from the above step was charged to a batch type high temperature furnace. A $N_2$—$H_2O$ stream sufficient to fluidize the microspheres was passed through the bed and the temperature raised to 1200° F. The $N_2$ was replaced by $H_2$ as the temperature passed 800° F. The 1200° F. temperature level was maintained for 3 hours, at which time the $H_2$ stream was discontinued. The bed temperautre was then raised to 1525° F. and held there 4 hours, using steam only to maintain the bed in the fluid state.

The surface area of the calcined microspheres was measured and found to be 120 square meters per gram. This value is indicative of a material suitable as a catalyst for hydrocarbon conversion purposes. The surface area of the kaolin catalyst was determined by a nitrogen adsorption method described by S. Brunauer, P. H. Emmett and E. Teller in their article entitled "Adsorption of Gases in Multi-Molecular Layers," page 309, Journal of the American Chemical Society, vol. 60, February 1958, using the molecular size data of H. K. Livingston presented in his article entitled "Cross-Sectional Areas of Molecules Adsorbed on Solid Surfaces," on page 569, Journal of the American Chemical Society, vol. 66, April 1944.

The microspheroidal kaolin cracking catalyst so produced was superior in hardness to fresh commercial fluid cracking catalysts, as shown in Table I which follows.

The hardness values reported in the table were determined by an attrition test in which a sample of fluid catalyst is subjected to attrition in a U-shaped glass sample holder and attrited matter is scalped from the test samples as soon as attrited by an air elutriation system. The test was carried out using the Roller Particle Size Analyzer supplied by the American Instrument Company, Inc., Silver Spring, Maryland (illustrated in Section I of Catalog No. 5-445 of American Instrument Company, Inc., entitled "Instructions for Roller Particle Size Analyzer") together with the air control and supply regulator and auxiliary equipment described in the same section of the reference. The humidity of air supplied to the Roller instrument was controlled at 60% R.H.

The Roller instrument was set to continuously elutriate minus 20 micron material from 44/78 micron test material (precalcined at 1050° F. for 16 hours) by control of the air flow rate which was determined by taking into consideration dry particle density to account for differences in porosity of the various test samples. Dry particle density was determined by equibrating a test sample in 100 percent R.H. air, under which condition pores of catalyst are filled with condensed water. The particles were then immersed in a Pycnometer tube and the saturated particle volume thus determined was assumed to be the dry particle volume.

The elutriated minus 20 micron particles were collected during the test of each sample and measured at the end of the test period indicated in the table. Hardness was reported as the weight percentage of test sample attrited to minus 20 micron during the test period.

For the purpose of comparison, the hardness of several fresh commercial fluid aluminosilicate cracking catalysts was determined. The results are reported in Table I.

*Table I*

HARDNESS OF FLUID ALUMINOSILICATE CRACKING CATALYSTS

| Catalyst | Hardness, Wt. Percent Sample Lost During Attrition Test | Test Period, Hours |
| --- | --- | --- |
| Kaolin catalyst | 5.1 | 46 |
| Commercial aluminosilicate catalyst No. 1 | 27.7 | 45 |
| Commercial aluminosilicate catalyst No. 2 | 27.1 | 29.5 |
| Commercial aluminosilicate catalyst No. 3 | 13.1 | 45 |
| Commercial aluminosilicate catalyst No. 4 | 24.5 | 45 |
| Commercial aluminosilicate catalyst No. 5 | 11.1 | 45 |

The results above tabulated show that the kaolin catalyst was markedly superior in attrition resistance to the other commercial aluminosilicate catalysts tested. More than 5 times as much of catalyst No. 2 was attrited to minus 20 micron material during a similar test period than was attrited in the kaolin catalyst. The kaolin catalyst represented even a more striking improvement in attrition resistance when compared with catalyst No. 3, which experienced over 5 times the weight loss of the kaolin catalyst during a test period ⅓ less than the kaolin catalyst had undergone.

EXAMPLE II

When a sample of kaolin clay is mixed with dilute $H_2SO_4$, e.g., an 80% dosage of acid diluted with water to adjust the volatile free solids level to about 20%, this mixture reacted at about 220° F. under autogenous pressure for about 24 hours and the resultant slurry spray-dried, dried and calcined as in Example I, it will be found that the attrition resistance of the resultant microspheres is materially less than a commercial fluid cracking catalyst. Likewise an unacceptable soft product is obtained if the acid dilution in the reaction mixture is adjusted to provide a 30% volatile free solids mix, the mixture reacted under autogenous pressure at about 220° F. for 24 hours, water added to the reacted mass to provide a slip of sprayable consistency, such as a 20% volatile free solids slip, and this slip spray-dried, dried and calcined as in Example I.

EXAMPLE III

When the catalyst preparation procedure of Example I is repeated with spray drying conducted under conditions such that the temperature of air initially contacting the atomized slurry is 600° F., and the material is spray-dried to a 52% V.M., it will be found that the resultant microspheres, after calcination as described in Example I, will be too soft to measure accurately by the aforementioned hardness testing procedure and will have a very low bulk density and include hollow particles.

EXAMPLE IV

The catalytic activity of a kaolin fluid cracking catalyst which was prepared in accordance with the steps set forth in Example I was evaluated by the procedure and with the equipment described in "Automatic Fluidized Fixed-Bed Catalytic Testing Unit" (Technical Report No. 175-53) by E. P. Davis and C. P. Brewer, a publication of Shell Development Company.

A 400 gram batch of the test kaolin fluid catalyst was charged to the fluidized fixed-bed catalyst testing unit. The charge was heated to 500 C. while a fluidizing stream of helium was passed through the unit. A vacuum-flashed distillate, largely of West Texas origin, whose properties are listed in Table No. II, was added to the helium stream (after a 15 minute flush period) so that the mol percent concentration of each component was 50 percent. The weight rate of flow of gas oil was varied in a series of runs (maintaining the mol percent concentration at 50 percent) to determine the relative activity of the experimental catalyst. In all cases, the cracking period was 15 minutes. After each cracking run, the gas oil flow was stopped, but the helium continued for another 15 minutes to strip the catalyst of residual volatile hydrocarbons. The combined overhead products from the flush period preceding cracking, the cracking period proper, and the stripping period following cracking were then worked up to give dry gas, gasoline ($C_5$—221° C.), and unconverted gas oil yields. Meanwhile, the catalyst was regenerated using air, and the coke yield measured by recovering the $CO_2$ (and CO as $CO_2$) in the regeneration off-gases.

Similar runs were made using a reference equilibrium high alumina synthetic catalyst. A summary of the cracking test data is given in Table No. III. The superiority of the kaolin catalyst is evident in the reduced coke make and increased gasoline yield.

*Table II*

ANALYSIS OF FEEDSTOCK TO CRACKING UNIT

Elementary analysis, weight percent:

| | |
| --- | --- |
| C | 85.59 |
| H | 12.22 |
| S | [1] 1.76 |
| N | 0.11 |
| O | 0.32 |
| | 100.00 |

[1] Thiophenic S=1.15.

Distillation range, ° F.:
    IBP _____ 520
    10% _____ 655
    50% _____ 835
    90% _____ 1020
    EP _____ 1115
Gravity, API_____ 24.0
Molecular weight_____ 353

*Table III*

CATALYTIC ACTIVITY OF FLUID ALUMINOSILICATE CRACKING CATALYSTS

| Catalyst | Kaolin Test Catalyst | Equilibrium High Alumina Synthetic Catalyst |
| --- | --- | --- |
| Product Distribution, Wt. percent: | | |
| Coke_____ | 6.5 | 7.6 |
| Gasoline_____ | 36.4 | 34.9 |
| Dry Gas_____ | 19.6 | 20.0 |
| Conversion_____ | 62.5 | 62.5 |
| Space Velocity, wt./(wt.)(hr.)____ | 2.0 | 1.4 |

It will be understood that the foregoing detailed examples are illustrative only, for variations and changes may be made in the conditions of the process without departing from the substance of the invention as herein disclosed and defined in the appended claims.

We claim:

1. A method for the prepartion of hard microspherical contact masses from kaolin clay comprising reacting kaolin clay with sulfuric acid in the form of a plastic mass thereof, said reaction being carried out while maintaining said mass out of contact with an external liquid aqueous phase so as to prevent leaching of soluble metallic sulfate reaction products from said mass, forming an aqueous slurry of the reacted mass utilizing at least sufficient water to dissolve said water soluble metallic sulfate reaction products from insoluble residue, spray drying said aqueous slurry in an atmosphere of hot inert gas while maintaining the temeprature of gas initially contacting droplets of said slurry below that at which hollow microspheres will be formed, thereby to form solid microspheres comprising a mixture of said insoluble residue with said soluble metallic sulfate, and desulfating said microspheres by calcination at an elevated temperature.

2. The method of claim 1 in which said gas is air.

3. The method of claim 1 in which the temperature of gas initially contacting droplets of said slurry is from 212° F. to 550° F.

4. The method of claim 1 in which the temperature of gas initially contacting droplets of said slurry is from 250° F. to 350° F.

5. The method of claim 1 in which said microspheres are dried to a volatile matter content not to exceed 50 percent at a temperature of from about 212° F. to about 600° F. prior to desulfation.

6. A method for the preparation of microspherical contact masses from kaolin clay comprising reacting kaolin clay with sulfuric acid under conditions such that water soluble metallic sulfate reaction products are kept in intimate contact with the reactants until reaction is completed, forming an aqueous slurry of the reacted mass, utilizing at least sufficient water to dissolve said water soluble metallic sulfate reaction products from insoluble residue, spray drying said slurry in an atmosphere of hot inert gas while maintaining the temperature of gas initially contacting droplets of said slurry below that at which hollow microspheres will be formed, thereby to form solid microspheres comprising a mixture of insoluble residue in intimate combination with said soluble metallic sulfate salts, and desulfating said microspheres by calcination at an elevated temperature.

7. A method for the preparation of microspherical contact masses from kaolin clay comprising reacting kaolin clay with sulfuric acid under conditions such that water soluble metallic sulfate reaction products are kept in intimate contact with the reactants until reaction is completed, forming an aqueous slurry of the reacted mass utilizing at least sufficient water to dissolve said water soluble metallic sulfate reaction products from insoluble residue, spray drying said slurry in an atmosphere of hot inert gas while maintaining the temperature of gas initially contacting droplets of said slurry below that at which hollow microspheres will be formed, thereby to form solid microspheres comprising a mixture of insoluble residue with said soluble metallic sulfate, and desulfating said microspheres by calcination at elevated temperature in a reducing atmosphere.

8. A method for the preparation of hard microspherical contact masses from kaolin clay comprising mixing kaolin clay with sulfuric acid in an amount of from 60 percent to 200 percent, based on the volatile free weight of said kaolin clay, said acid being sufficiently concentrated to form a plastic mass with said kaolin clay, reacting said clay with said acid while maintaining said mass out of contact with an external liquid aqueous phase so as to prevent leaching of soluble metallic sulfate reaction products therefrom, forming an aqueous slurry of the reacted mass utilizing at least sufficient water to dissolve soluble metallic sulfate reaction products from insoluble residue, spray drying said slurry in an atmosphere of hot inert gas while maintaining the temperature of gas initially contacting droplets of said slurry below that at which hollow microspheres will be formed, thereby to form solid microspheres comprising a mixture of insoluble residue with said soluble metallic sulfate salts, and desulfating said microspheres by calcination at elevated temperature.

9. A method for the preparation of hard microspherical contact masses from kaolin clay comprising mixing kaolin clay with sulfuric acid in an amount of from 75 percent to 150 percent, based on the volatile free weight of said kaolin clay, said sulfuric acid being in the form of an aqueous solution having a concentration of from 90 percent to 100 percent, reacting said kaolin clay with said sulfuric acid while maintaining the mixture out of contact with an external liquid aqueous phase, so as to avoid washing out of soluble metallic sulfate reaction products, forming an aqueous slurry of the reacted mass utilizing at least sufficient water to dissolve soluble reaction products from insoluble residue, spray drying said aqueous slurry into an atmosphere of hot inert gas under conditions such that the temperature of gas initially contacting droplets of said slurry is from about 250° F. to 350° F., thereby to form hard microspheres comprising a mixture of insoluble residue with said metallic sulfate, and desulfating said microspheres by calcination at elevated temperature.

10. A method for the preparation of hard microspherical contact masses from kaolin clay comprising mixing uncalcined kaolin clay with sulfuric acid in an amount of from 75 percent to 150 percent, based on the volatile free weight of said clay, said acid having a concentration of from about 60 percent to about 100 percent, so as to form a plastic mass thereof, reacting said kaolin clay with said acid while maintaining the mixture out of contact with an external liquid aqueous phase at a temperature of from about 250° F. to about 500° F. and for a time sufficient to effect substantial reaction between said kaolin clay and said acid, forming an aqueous slurry of the reacted mass utilizing at least sufficient water to dissolve soluble metallic sulfate reaction products from insoluble residue, spraying said aqueous slurry into an environment of hot inert gas under conditions such that the temperature of gas initially contacting droplets of said slurry is from 212° F. to 550° F., thereby to form hard microspheres comprising a mixture of insoluble residue with metallic sulfate, and desulfating said microspheres by calcination at an elevated temperature.

11. The method of claim 10 in which said gas is air.

12. The method of claim 10 in which the temperature of gas initially contacting droplets of said slurry is from 250° F. to 350° F.

13. The method of claim 10 in which said microspheres are dried to a volatile matter content not to exceed 50 percent at a temperature of from about 212° F. to about 600° F. prior to desulfation.

14. A method for the preparation of hard microspherical contact masses from kaolin clay comprising reacting kaolin clay with sulfuric acid in the form of a plastic mass thereof, said reaction being carried out in the absence of a liquid aqueous phase surrounding and in contact with said mass so as to prevent leaching of soluble metallic reaction products from said mass, forming an aqueous slurry of the reacted mass utilizing at least sufficient water to dissolve soluble aluminum sulfate reaction products from insoluble residue, spray drying said aqueous slurry in an atmosphere of hot inert gas passing countercurrently thereto under conditions such that the temperature of gases initially contacting droplets of said slurry is from 212° F. to 550° F., thereby to form hard solid microspheres comprising a mixture of aluminum sulfate and insoluble residue, drying said microspheres at a temperature not to exceed about 600° F. to a volatile matter content not to exceed about 50 percent, and desulfating said microspheres by calcination at an elevated temperature.

15. A method for the preparation of hard microspherical contact masses from kaolin clay comprising reacting a mixture of uncalcined kaolin clay and sulfuric acid of 90 percent to 100 percent concentration in an amount of from 75 percent to 150 percent, based on the volatile free weight of said kaolin clay, said reaction being carried out at 250° F. to 500° F. while maintaining the mixture out of contact with an external liquid aqueous phase so as to prevent washing out of soluble aluminum sulfate reaction products, forming an aqueous slurry of the reacted mass utilizing at least sufficient water to dissolve substantially completely soluble aluminum sulfate reaction product from insoluble residue, spraying said aqueous slurry into an atmosphere of hot inert gas under conditions such that the temperature of gases initially contacting droplets of said slurry is from 250° F. to 350° F., thereby to form hard solid microspheres comprising a mixture of aluminum sulfate and insoluble residue, drying said microspheres at a temperature not to exceed 600° F. to a volatile matter content not to exceed about 50 percent, and desulfating said microspheres by calcination at an elevated temperature.

16. The product produced in accordance with the method of claim 1.

17. The product produced in accordance with the method of claim 15.

References Cited in the file of this patent

UNITED STATES PATENTS 2,898,304    Powell et al. _____ Aug. 4, 1959